US012781869B2

(12) United States Patent
Yanagisawa et al.

(10) Patent No.: US 12,781,869 B2
(45) Date of Patent: Nov. 3, 2026

(54) MOTOR-OPERATED VALVE AND REFRIGERATION CYCLE DEVICE

(71) Applicant: FUJIKOKI CORPORATION, Tokyo (JP)

(72) Inventors: Shu Yanagisawa, Tokyo (JP); Takeshi Suganuma, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 19/161,483

(22) PCT Filed: Feb. 27, 2024

(86) PCT No.: PCT/JP2024/007029

§ 371 (c)(1),
(2) Date: Sep. 2, 2025

(87) PCT Pub. No.: WO2024/224795

PCT Pub. Date: Oct. 31, 2024

(65) Prior Publication Data

US 2026/0243366 A1 Aug. 20, 2026

(30) Foreign Application Priority Data

Apr. 24, 2023 (JP) ................................ 2023-071152

(51) Int. Cl.
*F16K 31/04* (2006.01)
*F16K 27/02* (2006.01)
(Continued)

(52) U.S. Cl.
CPC .......... *F16K 31/047* (2013.01); *F16K 27/029* (2013.01); *F25B 9/008* (2013.01); *F25B 41/35* (2021.01)

(58) Field of Classification Search
CPC ...... F16K 31/047; F16K 27/029; F25B 9/008; F25B 41/35
(Continued)

(56) References Cited

U.S. PATENT DOCUMENTS

| | | | | |
|---|---|---|---|---|
| 6,460,567 B1 * | 10/2002 | Hansen, III | ............ | F16K 31/04 137/625.48 |
| 7,611,124 B2 * | 11/2009 | Shindo | .................... | F16K 51/02 414/217 |

(Continued)

FOREIGN PATENT DOCUMENTS

| | | |
|---|---|---|
| JP | 2012197849 A | 10/2012 |
| JP | 2018189202 A | 11/2018 |

(Continued)

OTHER PUBLICATIONS

International Search Report, mailed Apr. 23, 2024, which was issued for the corresponding International application No. PCT/JP2024/007029, 5 pages, with English translation.

(Continued)

*Primary Examiner* — John Bastianelli
(74) *Attorney, Agent, or Firm* — LUCAS & MERCANTI, LLP

(57) ABSTRACT

A motor-operated valve is installed in a refrigeration cycle device using a natural refrigerant. The motor-operated valve includes a valve member, a driving mechanism that drives the valve member, and a can in which the driving mechanism is disposed. The natural refrigerant is introduced into the can. The driving mechanism includes a driving shaft with an external thread and a bearing member with an internal thread into which the external thread is screwed. A fluorinated grease is applied to the driving shaft and the bearing member.

5 Claims, 5 Drawing Sheets

(51) Int. Cl.
*F25B 9/00* (2006.01)
*F25B 41/35* (2021.01)

(58) Field of Classification Search
USPC .......................................... 251/129.11–129.13
See application file for complete search history.

(56) References Cited

U.S. PATENT DOCUMENTS

| | | | | |
|---|---|---|---|---|
| 7,900,888 | B2 * | 3/2011 | Weldon | H02K 7/06 251/267 |
| 2008/0121833 | A1 | 5/2008 | Weldon et al. | |
| 2014/0311179 | A1 | 10/2014 | Kojima et al. | |

FOREIGN PATENT DOCUMENTS

| | | | |
|---|---|---|---|
| WO | 2009093460 | A1 | 7/2009 |
| WO | 2013001751 | A1 | 1/2013 |

OTHER PUBLICATIONS

Written Opinion of the International Searching Authority, mailed Apr. 23, 2024, which was issued for the corresponding International application No. PCT/JP2024/007029, 7 pages, with English translation.

International Preliminary Report on Patentability, mailed Oct. 16, 2024, which was issued for the corresponding International application No. PCT/JP2024/007029, 6 pages, with English translation.

Office Action, dated Aug. 19, 2025, which was issued for the corresponding Japanese patent application No. 2023-071152, 9 pages, with English translation.

Office Action, mailed on Jun. 5, 2026, which was issued for the corresponding Korean Patent Application No. 10-2025-7004502, 7 pages, with English translation.

* cited by examiner

FIG.4

| | RESIDUAL AMOUNT OF GREASE | | | | | | | | |
|---|---|---|---|---|---|---|---|---|---|
| NUMBER OF CHARGING AND RECOVERY OPERATIONS | 0 | 10 | 20 | 30 | 40 | 50 | 60 | 70 | 80 |
| EXAMPLE 1 | 100% | – | 93% | 88% | 86% | 84% | 82% | 81% | 79% |
| EXAMPLE 2 | 100% | – | 93% | 88% | 85% | 83% | 82% | 80% | 79% |
| COMPARATIVE EXAMPLE 1 | 100% | – | 100% | – | – | – | – | – | – |
| COMPARATIVE EXAMPLE 2 | 100% | – | 24% | – | – | – | – | – | – |

MOTOR-OPERATED VALVE AND REFRIGERATION CYCLE DEVICE

CROSS REFERENCE TO RELATED APPLICATION

This Application is a 371 of PCT/JP2024/007029 filed on Feb. 27, 2024, which, in turn, claimed the priority of Japanese Patent Application No. 2023-071152 filed on Apr. 24, 2023, and both applications are incorporated herein by reference.

TECHNICAL FIELD

The present invention relates to a motor-operated valve and a refrigeration cycle device.

BACKGROUND ART

Patent Literature 1 discloses a motor-operated valve according to the related art. For example, the motor-operated valve in Patent Literature 1 is installed in a refrigeration cycle device and is used to control the flow rate of refrigerant. The motor-operated valve includes a can, a magnet rotor, a reduction gear mechanism, a driving shaft, a bearing member, and a valve member. The magnet rotor, the reduction gear mechanism, the driving shaft, and the bearing member are disposed inside the can. The refrigerant is introduced into the can. The magnet rotor is connected to the driving shaft via the reduction gear mechanism. The driving shaft has an external thread. The bearing member has an internal thread into which the external thread is screwed. When the driving shaft rotates, the driving shaft moves in the direction of the axis. The valve member moves in the direction of the axis in accordance with the movement of the driving shaft. The driving shaft, the bearing member, and gears of the reduction gear mechanism are sliding members, and grease is applied to these sliding members.

CITATION LIST

Patent Literature

Patent Literature 1: Japanese Unexamined Patent Application Publication No. 2012-197849

SUMMARY OF INVENTION

Technical Problem

Natural refrigerants may be used in refrigeration cycle devices. Natural refrigerants contain, for example, carbon dioxide or propane as a main component. Compared with hydrofluorocarbon (HFC) refrigerants used in many refrigeration cycle devices, natural refrigerants are circulated at high pressure.

The base oil of the grease applied to the sliding members of the motor-operated valve contains, as a main component, mineral oil or synthetic oil, such as ether-based oil or ester-based oil. Therefore, the grease has relatively high compatibility with refrigerating machine oil, which flows together with the refrigerants, and the grease may dissolve and be reduced in amount.

In a refrigeration cycle device using an HFC refrigerant, the difference in refrigerant pressure between the inlet and the outlet of the motor-operated valve is relatively small. Therefore, small forces are applied to the sliding members.

Consequently, even when the amount of grease is reduced, the lubricity can be supplemented by the refrigerating machine oil.

However, in a refrigeration cycle device using a natural refrigerant, the difference in refrigerant pressure between the inlet and the outlet of the motor-operated valve is relatively large. Therefore, large forces are applied to the sliding members. Consequently, when the amount of grease is reduced, the lubricity cannot be supplemented by the refrigerating machine oil. As a result, the durability of the sliding members may be reduced.

Accordingly, it is an object of the present invention to provide a motor-operated valve capable of suppressing a decrease in durability, and a refrigeration cycle device including the motor-operated valve and using a natural refrigerant.

Solution to Problem

To achieve the object above, a motor-operated valve according to an aspect of the present invention is a motor-operated valve used in a refrigeration cycle device that uses a natural refrigerant. The motor-operated valve includes a valve member, a driving mechanism that drives the valve member, and a case in which the driving mechanism is disposed. The natural refrigerant is introduced into the case. The driving mechanism includes sliding members. A fluorinated grease is applied to the sliding members.

In the present invention, preferably, the driving mechanism includes a magnet rotor, a reduction gear mechanism that includes gears, a driving shaft that has an external thread, and a bearing member that has an internal thread into which the external thread is screwed. Preferably, the magnet rotor is connected to the driving shaft via the reduction gear mechanism. Preferably, when the magnet rotor rotates, the driving shaft rotates and moves in a direction of an axis. Preferably, the valve member moves in the direction of the axis in accordance with movement of the driving shaft. Preferably, the driving shaft, the bearing member, and the gears are the sliding members.

In the present invention, preferably, the driving mechanism includes a magnet rotor, a reduction gear mechanism that includes gears, a driving shaft, and a rotary valve member connected to the driving shaft. Preferably, the magnet rotor is connected to the driving shaft via the reduction gear mechanism. Preferably, when the magnet rotor rotates, the driving shaft and the rotary valve member rotate. Preferably, the gears are the sliding members.

In the present invention, preferably, the driving mechanism includes a magnet rotor, an external thread member that has an external thread, and an internal thread member that has an internal thread into which the external thread is screwed.

Preferably, the magnet rotor is connected to the external thread member, the external thread member rotates and moves in a direction of an axis with respect to the internal thread member when the magnet rotor rotates, and the valve member moves in the direction of the axis in accordance with movement of the external thread member with respect to the internal thread member, or

- the magnet rotor is connected to the internal thread member, the internal thread member rotates and moves in a direction of an axis with respect to the external thread member when the magnet rotor rotates, and the valve member moves in the direction of the axis in accordance with movement of the internal thread member with respect to the external thread member.

Preferably, the external thread member and the internal thread member are the sliding members.

In the present invention, preferably, a base oil of the fluorinated grease contains, as a main component, one of perfluoropolyether, chlorotrifluoroethylene, and perfluoroalkyl ether.

In the present invention, preferably, the natural refrigerant contains carbon dioxide or propane as a main component. Preferably, a refrigerating machine oil that flows together with the natural refrigerant contains, as a main component, one of polyol ester, polyalkylene glycol, and polyvinyl ether.

To achieve the object above, a refrigeration cycle device according to another aspect of the present invention is a refrigeration cycle device using a natural refrigerant. The refrigeration cycle device includes a motor-operated valve including a valve member, a driving mechanism that drives the valve member, and a case in which the driving mechanism is disposed. The natural refrigerant is introduced into the case. The driving mechanism includes sliding members. A fluorinated grease is applied to the sliding members.

Advantageous Effects of Invention

According to the present invention, the driving mechanism of the motor-operated valve is disposed inside the case into which the natural refrigerant is introduced, and the fluorinated grease is applied to the sliding members of the driving mechanism. The fluorinated grease does not react with the main component of the natural refrigerant. The base oil of the fluorinated grease is fluorinated oil, and is either incompatible with or has very low compatibility with the refrigerating machine oil that flows together with the natural refrigerant. Consequently, in the motor-operated valve, the dissolution of the fluorinated grease can be suppressed, thereby maintaining the lubricity provided by the fluorinated grease. Therefore, a decrease in the durability of the sliding members of the motor-operated valve can be suppressed.

BRIEF DESCRIPTION OF DRAWINGS

FIG. 4 is a diagram showing results of a test on a reduction in the amount of grease caused by refrigerant.

DESCRIPTION OF EMBODIMENTS

A refrigeration cycle device according to an embodiment of the present invention is described below with reference to FIGS. 1 to 3.

Figure 1:
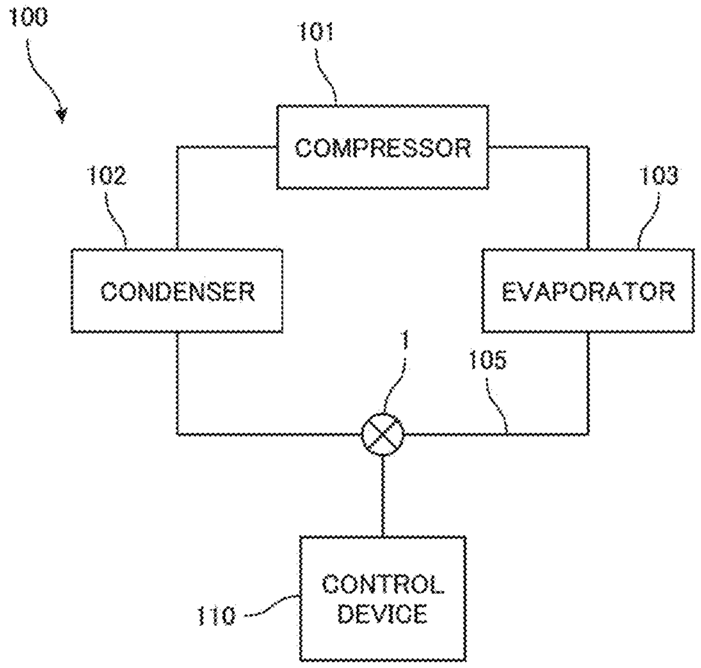
FIG. 1 is a block diagram of a refrigeration cycle device according to an embodiment of the present invention.

FIG. 1 is a block diagram of the refrigeration cycle device according to an embodiment of the present invention. FIG. 2 is a longitudinal sectional view of a motor-operated valve of the refrigeration cycle device in FIG. 1. FIG. 3 is an enlarged view of a part (including a driving mechanism and members in its vicinity) of the motor-operated valve in FIG. 2. In this description, the terms “up” and “down” refer to the up-and-down direction in each figure.

A refrigeration cycle device 100 is, for example, an air conditioner. The refrigeration cycle device 100 uses a natural refrigerant.

In the refrigeration cycle device 100, the natural refrigerant and refrigerating machine oil are circulated. The natural refrigerant contains carbon dioxide or propane as a main component. The refrigerating machine oil is, for example, polyalkylene glycol oil (PAG), polyol ester oil (POE), or polyvinyl ester oil (PVE).

As illustrated in FIG. 1, the refrigeration cycle device 100 includes a compressor 101, a condenser 102, a motor-operated valve 1, and an evaporator 103, which are connected in this order by a pipe 105. The motor-operated valve 1 serves as an expansion valve (a pressure reducer). The refrigeration cycle device 100 includes a control device 110. The control device 110 is connected to the motor-operated valve 1. The control device 110 uses the motor-operated valve 1 to control the flow rate of the natural refrigerant flowing through the pipe 105.

Figure 2:
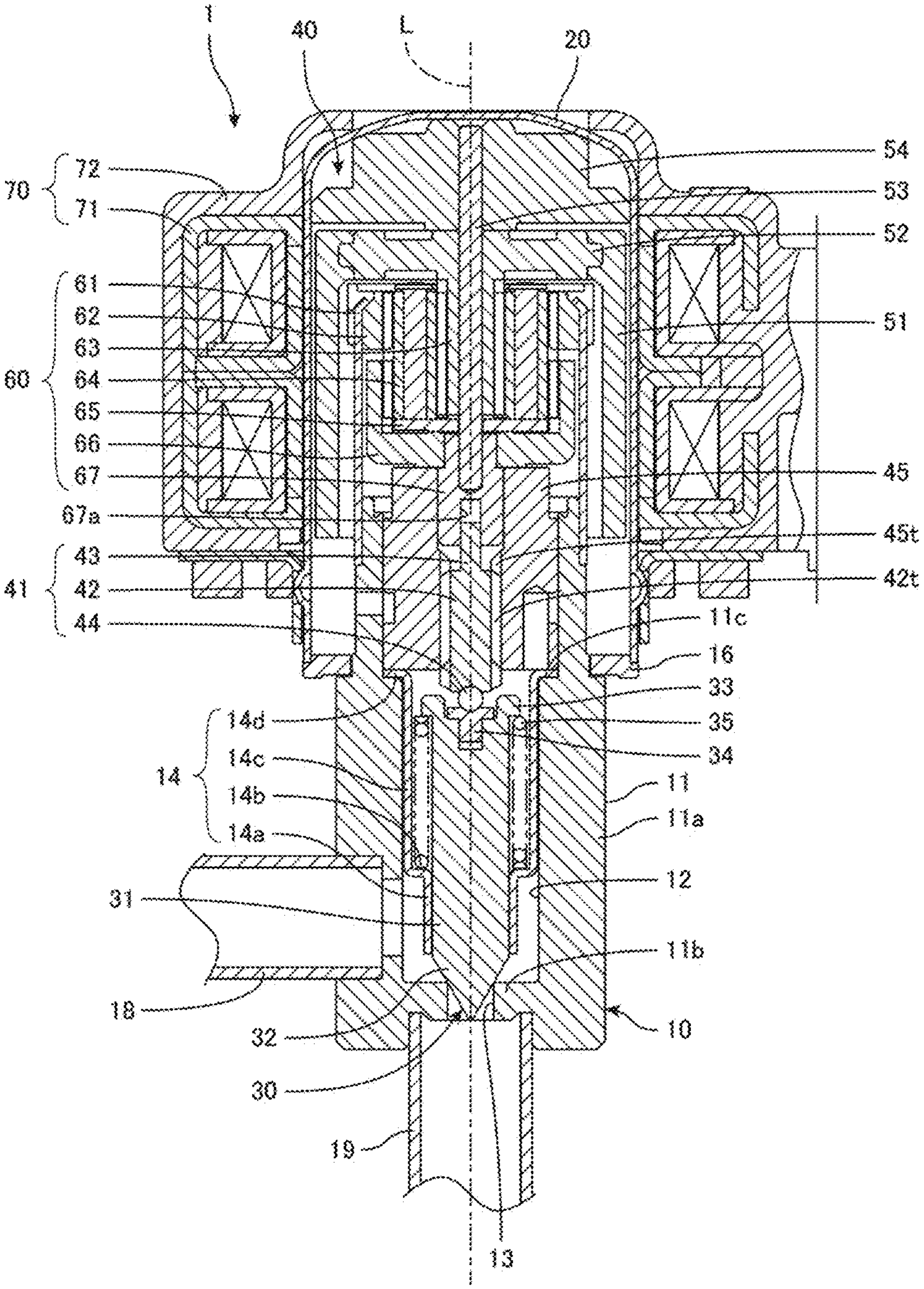
FIG. 2 is a longitudinal sectional view of a motor-operated valve of the refrigeration cycle device in FIG. 1.
Figure 3:
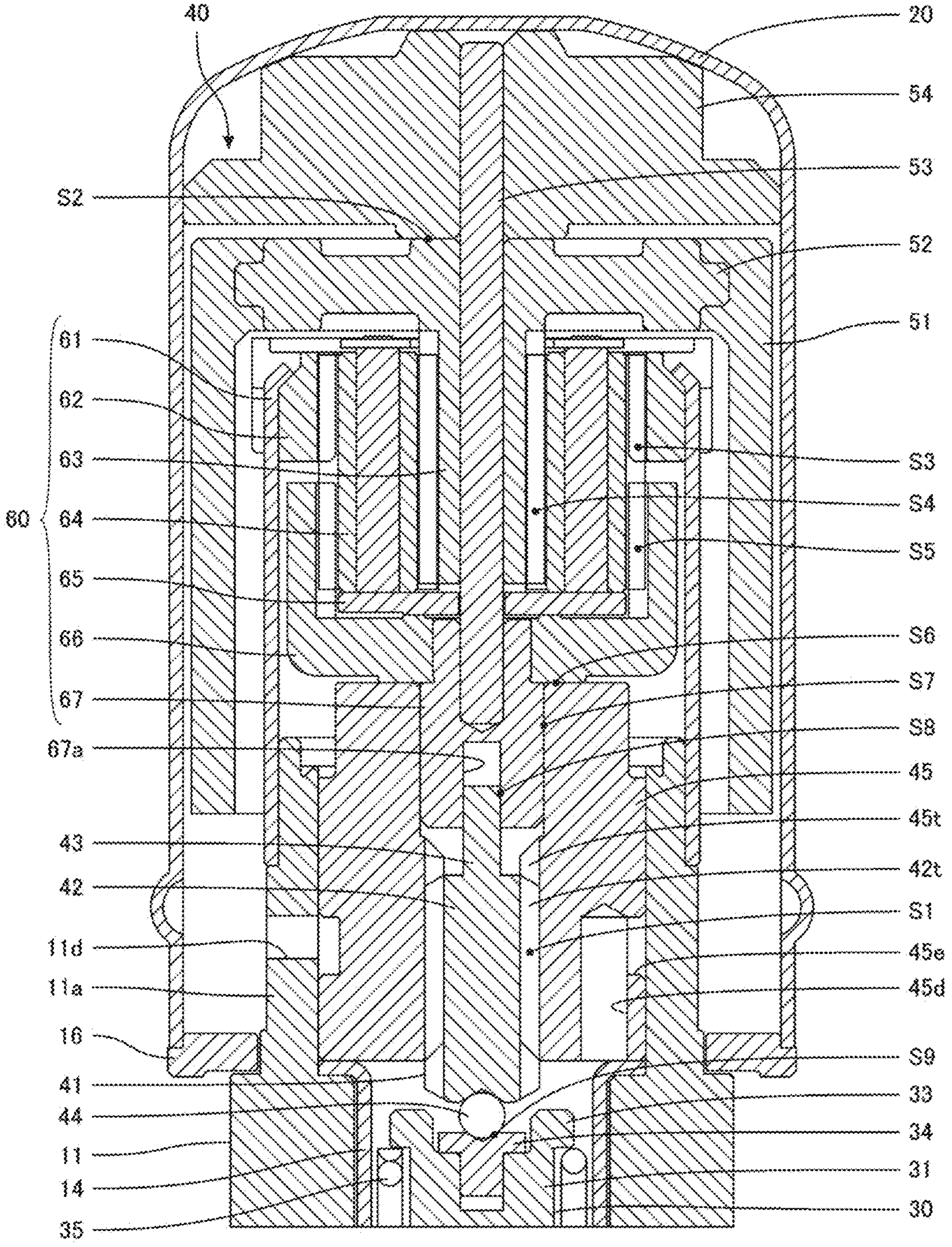
FIG. 3 is an enlarged view of a part of the motor-operated valve in FIG. 2.

As illustrated in FIGS. 2 and 3, the motor-operated valve 1 includes a valve body 10, a can 20, a valve member 30, a driving mechanism 40, and a stator unit 70.

The valve body 10 includes a housing 11, a sleeve 14, and a connection member 16.

The housing 11 has a circular cylindrical shape. The housing 11 integrally includes a peripheral wall 11*a* and a bottom wall 11*b*. The bottom wall 11*b* is connected to the lower end of the peripheral wall 11*a*. The housing 11 has a valve chamber 12 and a valve port 13. The valve port 13 is provided in the bottom wall 11*b* and is open to the valve chamber 12. The inner circumferential surface of the peripheral wall 11*a* includes a flat part 11*c* having a circular annular shape and facing upward. A lateral hole 11*d* is provided in the upper part of the peripheral wall 11*a*. A first conduit 18 is bonded to the peripheral wall 11*a*. The first conduit 18 is connected to the valve chamber 12. A second conduit 19 is bonded to the bottom wall 11*b*. The second conduit 19 is connected to the valve port 13.

The sleeve 14 has a circular cylindrical shape. The sleeve 14 integrally includes a first circular cylindrical portion 14*a*, a connection portion 14*b*, a second circular cylindrical portion 14*c*, and a flange portion 14*d*. The inner diameter of the second circular cylindrical portion 14*c* is greater than that of the first circular cylindrical portion 14*a*. The connection portion 14*b* has a circular annular flat plate-like shape. The inner peripheral edge of the connection portion 14*b* is connected to the upper end of the first circular cylindrical portion 14*a*, and the outer peripheral edge of the connection portion 14*b* is connected to the lower end of the second circular cylindrical portion 14*c*. The flange portion 14*d* has a circular annular flat plate-like shape. The inner peripheral edge of the flange portion 14*d* is connected to the upper end of the second circular cylindrical portion 14*c*. The first circular cylindrical portion 14*a*, the connection portion 14*b*, and the second circular cylindrical portion 14*c* are disposed in the valve chamber 12. The flange portion 14*d* is in contact with the flat part 11*c* of the housing 11.

The connection member 16 has a circular annular flat plate-like shape. The peripheral wall 11*a* is disposed at the inner side of the connection member 16. The inner peripheral edge of the connection member 16 is bonded to the peripheral wall 11*a*.

The can 20 has a circular cylindrical shape. The can 20 is open at the lower end and is closed at the upper end. The lower end of the can 20 is bonded to the outer peripheral edge of the connection member 16. The can 20 serves as a case.

The valve member 30 includes a body portion 31, a plug portion 32, a spring receiving portion 33, and a ball receiving portion 34. The body portion 31 has a circular columnar shape. The outer diameter of the body portion 31 is the same as the inner diameter of the first circular cylindrical portion 14*a* of the sleeve 14. The plug portion 32 has a conical shape with the tip pointing downward. The plug portion 32 is connected to the lower end of the body portion 31. The plug portion 32 faces the valve port 13 in the up-and-down direction (a direction of an axis L). The spring receiving portion 33 has a circular annular shape. The outer diameter of the spring receiving portion 33 is greater than that of the body portion 31. The spring receiving portion 33 is connected to the upper end of the body portion 31. The body portion 31, the plug portion 32, and the spring receiving portion 33 are integrally formed.

The body portion 31 is disposed inside the first circular cylindrical portion 14*a* and is supported therein so as to be movable in the up-and-down direction. The body portion 31 is disposed inside a valve opening spring 35. The valve opening spring 35 is a compression coil spring. The valve opening spring 35 is disposed between the spring receiving portion 33 and the connection portion 14*b* of the sleeve 14. The valve opening spring 35 pushes the valve member 30 upward.

The ball receiving portion 34 integrally includes a plate portion and a projection that has a columnar shape and is connected to the lower surface of the plate portion. The projection is fitted into a hole provided in the upper end surface of the body portion 31.

The driving mechanism 40 moves the valve member 30 in the up-and-down direction. The driving mechanism 40 is disposed inside the can 20. The driving mechanism 40 includes a driving shaft 41, a bearing member 45, a magnet rotor 51, a coupling member 52, a rotor shaft 53, a supporting member 54, and a planetary gear mechanism 60.

The driving shaft 41 includes a circular columnar portion 42, a flat plate portion 43, and a ball 44. The circular columnar portion 42 has an external thread 42*t*. The external thread 42*t* is provided on the outer circumferential surface of the circular columnar portion 42. The flat plate portion 43 extends upward from the upper end surface of the circular columnar portion 42. The circular columnar portion 42 and the flat plate portion 43 are integrally formed. The ball 44 is bonded to the lower end surface of the circular columnar portion 42. The driving shaft 41 is connected to the valve member 30. Specifically, the ball 44 of the driving shaft 41 is in slidable contact with the ball receiving portion 34 of the valve member 30.

The bearing member 45 has a circular cylindrical shape. The bearing member 45 is disposed inside the upper part of the peripheral wall 11*a* of the housing 11. The bearing member 45 is secured to the peripheral wall 11*a*. The flange portion 14*d* of the sleeve 14 is held between the lower end surface of the bearing member 45 and the flat part 11*c* of the peripheral wall 11*a*. The bearing member 45 has an internal thread 45*t*. The internal thread 45*t* is provided in the lower part of the inner circumferential surface of the bearing member 45. The external thread 42*t* of the driving shaft 41 is screwed into the internal thread 45*t*. The driving shaft 41 may have an internal thread, and the bearing member 45 may have an external thread that is screwed into the internal thread of the driving shaft 41.

The bearing member 45 has a longitudinal hole 45*d* and an annular groove 45*e*. The longitudinal hole 45*d* extends upward from the lower end surface of the bearing member 45. The annular groove 45*e* is provided in the outer circumferential surface of the bearing member 45 and extends in the circumferential direction. The annular groove 45*e* is connected to the upper part of the longitudinal hole 45*d*. The annular groove 45*e* is connected to the lateral hole 11*d* of the peripheral wall 11*a*.

The natural refrigerant in the valve chamber 12 passes through a gap between the sleeve 14 and the valve member 30, the interior of the sleeve 14, the longitudinal hole 45*d*, the annular groove 45*e*, and the lateral hole 11*d*, and is introduced into the can 20. The refrigerating machine oil that flows together with the natural refrigerant is also introduced into the can 20.

The ball receiving portion 34, the driving shaft 41, and the bearing member 45 are preferably made of a metal, such as stainless steel or brass. Additionally, the ball receiving portion 34, the driving shaft 41, and the bearing member 45 are preferably subjected to surface hardening, such as nitriding.

The magnet rotor 51 has a circular cylindrical shape. The coupling member 52 has a disc shape and is connected to the upper end of the magnet rotor 51. The magnet rotor 51 is coupled with the rotor shaft 53 via the coupling member 52. The supporting member 54 has a disc shape. The supporting member 54 is disposed above the magnet rotor 51. The supporting member 54 supports the upper end of the rotor shaft 53 in a rotatable manner.

The planetary gear mechanism 60 is a reduction gear mechanism that reduces the rotational speed of the magnet rotor 51. The planetary gear mechanism 60 connects the magnet rotor 51 and the driving shaft 41 and transmits the rotation of the magnet rotor 51 to the driving shaft 41. The planetary gear mechanism 60 is disposed inside the magnet rotor 51. The planetary gear mechanism 60 includes a gear case 61, a fixed ring gear 62, a sun gear 63, planetary gears 64, a carrier 65, an output gear 66, and an output shaft 67.

The gear case 61 has a circular cylindrical shape. The gear case 61 is secured to the upper part of the peripheral wall 11*a* of the housing 11. The fixed ring gear 62 is an internal gear. The fixed ring gear 62 is fixed to the upper part of the gear case 61. The sun gear 63 is coaxially connected to the lower surface of the coupling member 52. The sun gear 63 and the coupling member 52 are integrally formed. The rotor shaft 53 extends through the sun gear 63. The planetary gears 64 surround the sun gear 63. The planetary gears 64 mesh with the fixed ring gear 62 and the sun gear 63. The carrier 65 has a plate-like shape. The carrier 65 has support shafts that support the planetary gears 64 in a rotatable manner. The output gear 66 is an internal gear having a cylindrical shape with a bottom. The output gear 66 meshes with the planetary gears 64. Each gear is preferably made of a metal, such as stainless steel or brass, or of engineering plastic, such as polytetrafluoroethylene (PTFE).

The output shaft 67 has a circular columnar shape. The lower part of the output shaft 67 is disposed inside the bearing member 45. The outer circumferential surface of the output shaft 67 is in slidable contact with the inner circumferential surface of the bearing member 45. The output shaft 67 is supported by the bearing member 45 and is rotatable. The upper part of the output shaft 67 is secured to the bottom of the output gear 66, and the output shaft 67 rotates together with the output gear 66. The output shaft 67 has a support hole in which the lower end of the rotor shaft 53 is disposed. The output shaft 67 supports the lower end of the rotor shaft 53 in a rotatable manner. The output shaft 67 is preferably made of a metal, such as stainless steel or brass.

The output shaft 67 has a slit 67*a* that extends in the up-and-down direction. The slit 67*a* is provided in the lower part of the output shaft 67. The width of the slit 67*a* is the same as the thickness of the flat plate portion 43 of the driving shaft 41. The output shaft 67 is connected to the driving shaft 41. Specifically, the flat plate portion 43 is disposed in the slit 67*a* so as to be movable in the up-and-down direction. When the output shaft 67 rotates, the flat plate portion 43 (i.e., the driving shaft 41) rotates and moves in the up-and-down direction within the slit 67*a*.

The stator unit 70 includes a stator 71 and a stator case 72. The stator 71 has a circular cylindrical shape. The stator 71 is disposed outside the can 20. The stator 71 and the magnet rotor 51 constitute an electric motor. The stator case 72 is made of plastic and houses the stator 71. The stator unit 70 is secured to the can 20.

Each of the housing 11, the valve port 13, the sleeve 14, the can 20, the valve member 30, the driving shaft 41, the bearing member 45, the magnet rotor 51, the coupling member 52, the rotor shaft 53, the fixed ring gear 62, the sun gear 63, the output gear 66, and the output shaft 67 has a central axis aligned with the axis L.

The operation of the motor-operated valve 1 is described below.

In the motor-operated valve 1, the stator 71 is energized to rotate the magnet rotor 51 in one direction. The rotation of the magnet rotor 51 is transmitted to the driving shaft 41 via the planetary gear mechanism 60. As the driving shaft 41 rotates, a screw-feed action moves the driving shaft 41 downward. The driving shaft 41 pushes the valve member 30 downward. The valve member 30 moves downward, causing the plug portion 32 to move toward the valve port 13 and thereby reducing the opening degree of the valve port 13.

In the motor-operated valve 1, the stator 71 is energized to rotate the magnet rotor 51 in the other direction. The rotation of the magnet rotor 51 is transmitted to the driving shaft 41 via the planetary gear mechanism 60. As the driving shaft 41 rotates, the screw-feed action moves the driving shaft 41 upward. The valve member 30, pushed by the valve opening spring 35, moves upward, causing the plug portion 32 to move away from the valve port 13 and thereby increasing the opening degree of the valve port 13.

When the motor-operated valve 1 operates, sliding occurs between members of the driving mechanism 40. Specifically, sliding occurs between the external thread 42*t* of the driving shaft 41 and the internal thread 45*t* of the bearing member 45 (S1), between the coupling member 52 and the supporting member 54 (S2), between the fixed ring gear 62 and the planetary gears 64 (S3), between the sun gear 63 and the planetary gears 64 (S4), between the output gear 66 and the planetary gears 64 (S5), between the bearing member 45 and the output gear 66 (S6), between the bearing member 45 and the output shaft 67 (S7), between the flat plate portion 43 of the driving shaft 41 and the inner surface of the slit 67*a* of the output shaft 67 (S8), and between the ball receiving portion 34 and the ball 44 (S9). These sliding contact portions are denoted by reference signs S1 to S9 in FIG. 3.

The driving shaft 41, the bearing member 45, the coupling member 52, the supporting member 54, the fixed ring gear 62, the sun gear 63, the planetary gears 64, the output gear 66, and the output shaft 67 are sliding members. Fluorinated grease is applied to the sliding members.

Fluorinated grease contains base oil, thickener, and solid lubricant. The base oil is fluorinated oil that contains, for example, any one of perfluoropolyether (PFPE), chlorotrifluoroethylene (CTFE), and perfluoroalkyl ether (PFAE) as a main component. The base oil does not have a chemical structure that reacts with the main component (i.e., carbon dioxide or propane) of the natural refrigerant. The base oil is either incompatible with or has very low compatibility with the main component of the natural refrigerant and the refrigerating machine oil. In the embodiment, the thickener and the solid lubricant are polytetrafluoroethylene (PTFE). PTFE is either incompatible with or has very low compatibility with the main component of the natural refrigerant and the refrigerating machine oil. Therefore, the fluorinated grease does not dissolve in the natural refrigerant or the refrigerating machine oil, or only a very small amount of the fluorinated grease dissolves therein. Instead of PTFE, any one of bentonite, soap-based materials (including calcium soap, calcium complex, sodium soap, aluminum soap, aluminum complex, lithium soap, and lithium complex), silica gel, and polyurea may be used as the thickener. Alternatively, one or more of these materials may be mixed with PTFE and used.

As described above, the refrigeration cycle device 100 using the natural refrigerant includes the motor-operated valve 1. The motor-operated valve 1 includes the valve member 30, the driving mechanism 40 that drives the valve member 30, and the can 20 in which the driving mechanism 40 is disposed. The natural refrigerant and the refrigerating machine oil are introduced into the can 20.

The driving mechanism 40 includes the driving shaft 41, the bearing member 45, the magnet rotor 51, and the planetary gear mechanism 60. The driving shaft 41 has the external thread 42*t*. The bearing member 45 has the internal thread 45*t* into which the external thread 42*t* is screwed. The planetary gear mechanism 60 includes the gears (i.e., the fixed ring gear 62, the sun gear 63, the planetary gears 64, and the output gear 66). The magnet rotor 51 is connected to the driving shaft 41 via the planetary gear mechanism 60. When the magnet rotor 51 rotates, the driving shaft 41 rotates and moves in the up-and-down direction. The valve member 30 moves in the up-and-down direction in accordance with the movement of the driving shaft 41. The driving shaft 41, the bearing member 45, and the gears are sliding members, and the fluorinated grease is applied to these sliding members.

The fluorinated grease does not react with the main component of the natural refrigerant. The base oil of the fluorinated grease is fluorinated oil, and the base oil of the fluorinated grease is either incompatible with or has very low compatibility with the refrigerating machine oil that flows together with the natural refrigerant. Consequently, the dissolution of the fluorinated grease in the natural refrigerant or the refrigerating machine oil can be suppressed, thereby maintaining the lubricity provided by the fluorinated grease in the sliding members. Therefore, a decrease in the durability of the sliding members of the motor-operated valve 1 can be suppressed.

The motor-operated valve 1 may have a configuration without a reduction gear mechanism that reduces the rotational speed of the magnet rotor 51. In this configuration, for example, a driving mechanism 40 includes a magnet rotor 51, a driving shaft 41, and a bearing member 45. The driving shaft 41 has an external thread 42*t*. The bearing member 45 has an internal thread 45*t* into which the external thread 42*t* is screwed. The magnet rotor 51 is directly connected to the driving shaft 41. A valve member 30 is directly connected to the lower end of the driving shaft 41. The rotation of the magnet rotor 51 is directly transmitted to the driving shaft 41. When the magnet rotor 51 rotates, the driving shaft 41 rotates and moves in the up-and-down direction with respect to the bearing member 45. The driving shaft 41 is an external thread member and is a first member. The bearing member 45 is an internal thread member and is a second member. The valve member 30 moves in the up-and-down direction in accordance with the movement of the driving shaft 41. The driving shaft 41 and the bearing member 45 are sliding members, and fluorinated grease is applied to these sliding members. The driving shaft 41 may have an internal thread, and the bearing member 45 may have an external thread that is screwed into the internal thread of the driving shaft 41.

Alternatively, the motor-operated valve 1 may have a configuration with a ball valve member (i.e., a rotary valve member) that rotates about an axis L, as an alternative to the valve member 30 that moves in the up-and-down direction (the direction of the axis L). In this configuration, a driving mechanism 40 includes a magnet rotor 51, a planetary gear mechanism 60, a driving shaft 41, and the ball valve member that is connected to the driving shaft 41. The magnet rotor 51 is connected to the driving shaft 41 via the planetary gear mechanism 60. When the magnet rotor 51 rotates, the driving shaft 41 and the ball valve member rotate. The driving shaft 41 does not move in the up-and-down direction (the direction of the axis). Gears of the planetary gear mechanism 60 are sliding members, and fluorinated grease is applied to the sliding members.

These configurations have the same functions and effects as those of the motor-operated valve 1 described above.

The present inventors conducted a test on a reduction in the amount of grease caused by refrigerant and refrigerating machine oil, using Examples 1 and 2 and Comparative Examples 1 and 2 of the present invention.

EXAMPLE 1

An assembly including the magnet rotor 51, the coupling member 52, the rotor shaft 53, and the planetary gear mechanism 60 was prepared. A specified amount of fluorinated grease was applied to the sliding members included in the assembly, and after the weight (initial weight) of the assembly was measured, the assembly was installed into the motor-operated valve 1. A fluorinated grease, containing PFAE as a main component of the base oil and PTFE as a main component of both the thickener and the solid lubricant, was used.

EXAMPLE 2

An assembly including the magnet rotor 51, the coupling member 52, the rotor shaft 53, and the planetary gear mechanism 60 was prepared. A specified amount of fluorinated grease was applied to the sliding members included in the assembly, and the weight (initial weight) of the assembly was measured. After the assembly was immersed in refrigerating machine oil at a temperature of 120° C. for 96 hours, the assembly was installed into the motor-operated valve 1. The same fluorinated grease as in Example 1 was used. A refrigerating machine oil, containing polyvinyl ether as a main component, was used. Such a refrigerating machine oil is used in refrigeration cycle devices using HFC refrigerants. Example 2 was designed to simulate an accelerated influence of the refrigerating machine oil.

COMPARATIVE EXAMPLE 1

An assembly including the magnet rotor 51, the coupling member 52, the rotor shaft 53, and the planetary gear mechanism 60 was prepared. A specified amount of mineral-oil-based grease was applied to the sliding members included in the assembly, and after the weight (initial weight) of the assembly was measured, the assembly was installed into the motor-operated valve 1. A mineral-oil-based grease, containing mineral oil as a main component of the base oil, bentonite as a main component of the thickener, and molybdenum disulfide as a main component of the solid lubricant, was used.

COMPARATIVE EXAMPLE 2

An assembly including the magnet rotor 51, the coupling member 52, the rotor shaft 53, and the planetary gear mechanism 60 was prepared. A specified amount of mineral-oil-based grease was applied to the sliding members included in the assembly, and the weight (initial weight) of the assembly was measured. After the assembly was immersed in refrigerating machine oil at a temperature of 120° C. for 96 hours, the assembly was installed into the motor-operated valve 1. The same mineral-oil-based grease as in Comparative Example 1 was used. The same refrigerating machine oil as in Example 2 was used. Comparative Example 2 was designed to simulate an accelerated influence of the refrigerating machine oil.

Test

Figure 5:
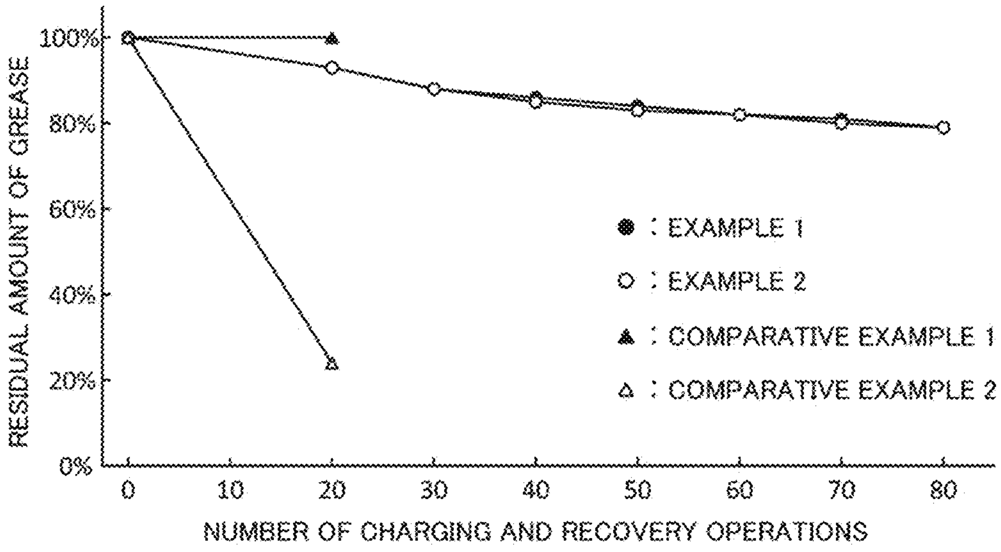
FIG. 5 is a graph showing the results of the test in FIG. 4.

A refrigerant supplying device is connected to one of the conduits of the motor-operated valve 1, and a refrigerant recovery device is connected to the other. A liquid-phase refrigerant (excluding refrigerating machine oil) is charged into the valve chamber 12 and the can 20 of the motor-operated valve 1 using the refrigerant supplying device, and then the refrigerant is recovered using the refrigerant recovery device to empty the valve chamber 12 and the can 20. This operation is referred to as a charging and recovery operation. In Example 1 and Comparative Example 1, when the grease is compatible with the refrigerant, the grease dissolves in the recovered refrigerant. In Example 2 and Comparative Example 2, when the grease is compatible with the refrigerating machine oil, the grease dissolves during immersion in the refrigerating machine oil and flows out from the locations where the grease was applied. Even if the refrigerating machine oil or the grease dissolved therein remains in the motor-operated valve 1, the refrigerating machine oil dissolves in the refrigerant, and both the grease and the refrigerating machine oil are recovered together with the refrigerant. After a predetermined number of the charging and recovery operations, the assembly is removed from the motor-operated valve 1, and the weight of the assembly is measured. The residual amount (%) of the grease is calculated based on the initial weight and the measured weight. The refrigerant used is R410A (HFC refrigerant). The refrigerating machine oil used in the test is compatible with R410A. The results of the test for Examples 1 and 2 and Comparative Examples 1 and 2 are shown in FIGS. 4 and 5. FIG. 4 is a table showing the number of the charging and recovery operations and the residual amount of the grease. FIG. 5 is a graph showing the relationship between the number of the charging and recovery operations and the residual amount of the grease.

When the charging and recovery operation is repeated 20 times for Comparative Examples 1 and 2, the amount of grease in Comparative Example 1 is reduced very little, whereas the amount of grease in Comparative Example 2 is significantly reduced. This shows that mineral-oil-based grease does not react with the HFC refrigerant but is compatible with the refrigerating machine oil, and that mineral-oil-based grease dissolves when the refrigerating machine oil flows together with the refrigerant.

When the charging and recovery operation is repeated for Examples 1 and 2, the amount of grease in each of Examples 1 and 2 is gradually reduced as the number of operations increases. In each of Examples 1 and 2, the amount of grease is reduced in a similar manner, and even when an accelerated influence of the refrigerating machine oil is simulated, there is no difference in the change in the residual amount of the grease. This shows that the fluorinated grease is incompatible with the refrigerating machine oil. The reduction in the amount of the fluorinated grease is presumed to be caused by a reaction between the base oil of the fluorinated grease and the HFC refrigerant. On the other hand, the base oil of the fluorinated grease does not have a chemical structure that reacts with the main component of the natural refrigerant. Therefore, it is considered that the fluorinated grease does not dissolve in either the natural refrigerant or the refrigerating machine oil. These results of the test support the effects of the present invention.

In this specification, the terms indicating shapes, such as "circular cylindrical" and "circular columnar", are also used for members and portions of the members substantially having the shapes indicated by the terms. For example, "circular cylindrical member" includes a circular cylindrical member and a substantially circular cylindrical member. Additionally, in this specification, the term "the same" may include strictly the same and substantially the same.

The embodiments of the present invention are described above. The present invention, however, is not limited to these embodiments. Embodiments obtained by a person skilled in the art appropriately adding, removing, or modifying components according to the embodiments described above, and an embodiment obtained by appropriately combining features of the embodiments are included in the scope of the present invention without departing from the spirit of the present invention.

REFERENCE SIGNS LIST

1 . . . motor-operated valve, 10 . . . valve body, 11 . . . housing, 11*a* . . . peripheral wall, 11*b* . . . bottom wall, 11*c* . . . flat part, 11*d* . . . lateral hole, 12 . . . valve chamber, 13 . . . valve port, 14 . . . sleeve, 14*a* . . . first circular cylindrical portion, 14*b* . . . connection portion, 14*c* . . . second circular cylindrical portion, 14*d* . . . flange portion, 16 . . . connection member, 18 . . . first conduit, 19 . . . second conduit, 20 . . . can, 30 . . . valve member, 31 . . . body portion, 32 . . . plug portion, 33 . . . spring receiving portion, 34 . . . ball receiving portion, 35 . . . valve opening spring, 40 . . . driving mechanism, 41 . . . driving shaft, 42 . . . circular columnar portion, 42*t* . . . external thread, 43 . . . flat plate portion, 44 . . . ball, 45 . . . bearing member, 45*d* . . . longitudinal hole, 45*e* . . . annular groove, 45*t* . . . internal thread, 51 . . . magnet rotor, 52 . . . coupling member, 53 . . . rotor shaft, 54 . . . supporting member, 60 . . . planetary gear mechanism, 61 . . . gear case, 62 . . . fixed ring gear, 63 . . . sun gear, 64 . . . planetary gear, 65 . . . carrier, 66 . . . output gear, 67 . . . output shaft, 67*a* . . . slit, 70 . . . stator unit, 71 . . . stator, 72 . . . stator case, 100 . . . refrigeration cycle device, 101 . . . compressor, 102 . . . condenser, 103 . . . evaporator, 105 . . . . pipe, 110 . . . control device, L . . . axis, S1 to S9 . . . sliding contact portion.

The invention claimed is:

1. A motor-operated valve used in a refrigeration cycle device that uses a natural refrigerant, the motor-operated valve comprising:

a valve member;

a valve body that has a valve chamber;

a driving mechanism that drives the valve member; and a case in which the driving mechanism is disposed, wherein the case has a circular cylindrical shape, and the case is open at a first end and is closed at a second end, wherein the first end of the case is bonded to the valve body, wherein the natural refrigerant is introduced into the case, wherein the driving mechanism includes sliding members, wherein a fluorinated grease is applied to the sliding members, wherein a base oil of the fluorinated grease contains, as a main component, one of perfluoropolyether, chlorotrifluoroethylene, and perfluoroalkyl ether, wherein the natural refrigerant contains carbon dioxide or propane as a main component, and wherein a refrigerating machine oil that flows together with the natural refrigerant contains, as a main component, one of polyol ester, polyalkylene glycol, and polyvinyl ether.

2. The motor-operated valve according to claim 1, wherein the driving mechanism includes a magnet rotor that has a circular cylindrical shape, a reduction gear mechanism that is disposed inside the magnet rotor and includes gears, a driving shaft that has an external thread, and a bearing member that has an internal thread into which the external thread is screwed, wherein the magnet rotor is connected to the driving shaft via the reduction gear mechanism, wherein when the magnet rotor rotates, the driving shaft rotates and moves in a direction of an axis, wherein the valve member moves in the direction of the axis in accordance with movement of the driving shaft, and wherein the driving shaft, the bearing member, and the gears are the sliding members.

3. The motor-operated valve according to claim 1, wherein the driving mechanism includes a magnet rotor that has a circular cylindrical shape, a reduction gear mechanism that is disposed inside the magnet rotor and includes gears, and a driving shaft, wherein the valve member is a rotary valve member connected to the driving shaft, wherein the magnet rotor is connected to the driving shaft via the reduction gear mechanism, wherein when the magnet rotor rotates, the driving shaft and the rotary valve member rotate, and wherein the gears are the sliding members.

4. The motor-operated valve according to claim 1, wherein the driving mechanism includes a magnet rotor, an external thread member that has an external thread, and an internal thread member that has an internal thread into which the external thread is screwed, wherein the magnet rotor is directly connected to the external thread member, the external thread member rotates and moves in a direction of an axis with respect to the internal thread member when the magnet rotor rotates, and the valve member moves in the direction of the axis in accordance with movement of the external thread member with respect to the internal thread member, or the magnet rotor is directly connected to the internal thread member, the internal thread member rotates and moves in a direction of an axis with respect to the external thread member when the magnet rotor rotates, and the valve member moves in the direction of the axis in accordance with movement of the internal thread member with respect to the external thread member, and wherein the external thread member and the internal thread member are the sliding members.

5. A refrigeration cycle device using a natural refrigerant, the refrigeration cycle device comprising:

a motor-operated valve including a valve member;

a valve body that has a valve chamber;

a driving mechanism that drives the valve member; and a case in which the driving mechanism is disposed, wherein the case has a circular cylindrical shape, and the case is open at a first end and is closed at a second end, wherein the first end of the case is bonded to the valve body, wherein the natural refrigerant is introduced into the case, wherein the driving mechanism includes sliding members, wherein a fluorinated grease is applied to the sliding members, wherein a base oil of the fluorinated grease contains, as a main component, one of perfluoropolyether, chlorotrifluoroethylene, and perfluoroalkyl ether, wherein the natural refrigerant contains carbon dioxide or propane as a main component, and wherein a refrigerating machine oil that flows together with the natural refrigerant contains, as a main component, one of polyol ester, polyalkylene glycol, and polyvinyl ether.

* * * * *